3,349,068
HYDROLYZED ISOPROPENYL ACETATE POLYMERS AND PROCESS

Stanley Bywater and Edward Whalley, Ottawa, Ontario, Canada, assignors to National Research Council, Ottawa, Ontario, Canada, a corporate body
No Drawing. Filed Dec. 2, 1960, Ser. No. 73,210
2 Claims. (Cl. 260—91.3)

This invention relates to polymers of isopropenyl acetate, to their hydrolysis product and to methods for their preparation.

Isopropenyl acetate is a colorless liquid of specific gravity 0.917 ($d_4^{20}$), boiling point of about 97° C. and $n_D^{20}$ of 1.4001. This unsaturated ester monomer is known to copolymerize with various vinylic monomers including vinyl chloride and maleic esters to give film-forming products. Isopropenyl acetate will only homopolymerize with difficulty, however, and heretofore only low molecular weight, low melting homopolymers have been known. These known homopolymers are viscous liquids at room temperature with molecular weights below about 3000 (Journal of Polymer Science, Vol. 5, 1950, pages 55 ff. and 743, and "Vinyl and Related Polymers" Schildknecht, Wiley and Sons, 1952, page 371). One solid homopolyer melting about 80° C. and of low molecular weight has been reported (United States Patent No. 2,751,372 June 19, 1956—Example 1). This solid homopolymer has been found by applicants to have an intrinsic viscosity (in acetone at 25° C.) of 0.045 (which corresponds to an approximate molecular weight of 3500).

The halogenated derivatives of isopropenyl acetate i.e. isopropenyl chloro- or fluoro- acetates are known to homopolymerize to give solid resinous polymeric products. Allyl acetate homopolymers of very low molecular weight have been prepared, but high molecular weight homopolymers are unknown.

Since polymethyl acrylates are usually tough, leathery, slightly tacky elastomers while polymethyl methacrylates are generally rigid, hard resins, it would be expected that compared to polyvinyl acetates which are soft, cold-flowing resins, the equivalent poly-(isopropenyl acetates) would be rigid and hard (D.P. being constant).

It is an object of this invention to provide a process for the homopolymerization of isopropenyl acetate. A further object is to prepare novel solid homopolymers of isopropenyl acetate having a high melting point, good transparency and molding properties previously unknown for poly-(isopropenyl acetates). Another object is to prepare the hydrolysis product poly-(alpha-methylvinyl alcohol) which is water-insoluble.

This invention provides new solid homopolymers of isopropenyl acetate melting above 100° C., preferably above 120° C., having the intrinsic viscosity ($\eta$) in acetone solution above about 0.1 and molecular weights above about 10,000.

The polymermization process is carried out by subjecting the monomer to high pressures above about 7000 atmospheres and preferably about 10,000 atmospheres or above. Any appropriate means for obtaining the high pressures can be used. For instance a cylinder having a rigid cap at one end and a close fitting plunger at the other can be used to contain the monomer. The cylinder is inserted in a high pressure cell capable of withstanding the pressures used. The pressure is transmitted via the plunger to the liquid monomer in the cylinder. The cell is immersed in an oil bath which is thermostatically controlled at the required temperature. The pressure is raised in the oil bath by means of a conventional pressure intensifier. Other suitable apparatus can be used, which is known to those skilled in the art. Higher pressures can be attained using specialized equipment. The higher pressures (about 10,000 atmospheres and above) tend to give an increased rate of reaction.

At temperatures above 70° C. and pressures above about 7000 atmospheres, thermal polymerization occurs at an appreciable rate and the presence of a catalyst is unnecessary. A conventional free radical type catalyst is usually used. Such catalysts include peroxides, especially organic peroxides, hydroperoxides, azo compounds such as azonitriles, hydrazinium compounds, and the like. The proportion of catalyst ranges from about 0.01 to about 1.5% by weight of monomer. The preferred range is 0.03 to 1%. Higher molecular weight polymers are usually produced at the lower catalyst concentrations or the lower rates of reaction (pressure constant). If thermal polymerization is used, the resulting polymer is free of catalyst residues.

The polymerization temperatures can range from about 20° C. to about 150° C. or above. The preferred range is from 40° C. to 130° C. with some catalyst being used. The time required for substantial completion of the reaction varies depending on the catalyst and temperature used. In general, the greater the amount and activity of the catalyst, and the higher the temperature—the shorter the time required.

The solid poly-(isopropenyl acetates) of this invention would be useful in some applications known for polyvinyl acetates. However, the polymers are more rigid than equivalent polyvinyl acetates and are more suitable for molding uses, film-forming, etc. like polymethyl methacrylate. The homopolymers are transparent, amorphous, and non-crystalline. The melting point tends to level off at about 125° C. as the molecular weight increases above about 15,000. The molecular weights vary from about 10,000 to about 60,000 or above—intrinsic viscosity ($\eta$) of about 0.1 to about 0.3 or above.

Films can be cast from solutions of the polymer. Suitable solvents include acetone, benzene, methanol, chloroform, carbon tetrachloride, and butyl acetate. Such films are clear, colorless, and, if unplasticized, somewhat brittle. Compression or injection moldings can be made. Again, if unplasticized, the moldings tend to be brittle. The homopolymers can be plasticized, if desired. Suitable plasticizers include phthalate esters, adipic acid esters, and triethylene glycol diesters. The homopolymers are satisfactorily heat and light stable for most uses. Fillers and coloring matters can be incorporated, if desired.

The poly-(isopropenyl acetate) can be hydrolyzed to the corresponding poly-(alpha-methylvinyl alcohol). These poly-alcohols are solid, colorless, water-insoluble, soluble in lower alcohols and chloroform, and form gels with toluene and acetone. The hydrolysis may be conducted in a manner similar to that for producing polyvinyl alcohol. Alkaline hydrolysis is preferred. These water-insoluble poly-alcohols may be used in applications where their reactive hydroxyl groups would be advantageous.

Intrinsic viscosity ($\eta$) measurements reported herein were carried out on acetone solutions at 25° C. The polymer molecular weight was calculated from ($\eta$) using the relationship given in "Principles of Polymer Chemistry," Flory, Cornell Univ. Press, 1953, page 312, or in Schildknecht—supra—page 339.

$$(\eta) = [1.76 \times 10^{-4} M^{0.68}]$$

where M=molecular weight.

While this relationship was developed for polyvinyl acetate, it is also approximately true for poly-(isopropenyl acetates) above about 10,000 M. Alphamethyl substitution has been found to not change the ($\eta$)—M relationship appreciably in similar polymers (Trans. Faraday Soc. vol. 55, page 2124, 1959, Sirianni, Worsfold and Bywater).

The melting points were measured on a hot stage melting point apparatus. The temperature was raised very slowly and the melting point taken as the final change of the opaque finely divided material to a transparent liquid.

Examples 1 to 5 illustrates the preparation of the polymer. In each case, the isopropenyl acetate was fractionally distilled before use. Stock solutions were transferred as required to the glass cylinders having a close fitting plunger at one end and a cap at the other. The solutions in the cylinder were de-oxygenated by purified nitrogen, the cylinder capped, and then transferred to the high pressure cell. When the reaction was complete the pressure was released and the contents of the glass cylinder precipitated with, and washed with, petroleum ether. The homopolymers were then dried and weighed.

*Example 1*

917 parts of distilled isopropenyl acetate containing 0.46 part of di-t-butyl peroxide were held at 120° C. and 10,000 atmospheres for 2 hours. The reaction product was isolated as described above, and 163 parts were obtained. The intrinsic viscosity ($\eta$) was 0.16 giving a M.W. of 22,000.

*Example 2*

917 parts of distilled isopropenyl acetate containing 0.46 part of di-t-butyl peroxide were held at 120° C. and 8,000 atmospheres for 2 hours. The isolated reaction product consisted of 81 parts of polymer. The ($\eta$) was 0.133 giving a molecular weight of 18,000.

*Example 3*

45.9 parts of distilled isopropenyl acetate were heated alone (in the absence of catalyst- at 100° C. and 10,000 atmospheres for 2 hours. 3.8 parts of solid polymer were obtained on isolation.

*Example 4*

92 parts of distilled isopropenyl acetate containing 1 part of benzoyl peroxide were held at 50° C. and 10,000 atmospheres for 2 hours. 7.4 parts of polymer were obtained after isolation. The ($\eta$) was 0.205 and the molecular weight 31,000.

*Example 5*

91.7 parts of distilled isopropenyl acetate containing 0.1 part of benzoyl peroxide was held at 50° C. and 10,000 atmospheres for 2 hours. 4.3 parts of the isolated reaction product were obtained. The ($\eta$) was 0.29 and the molecular weight 55,000.

The melting points of all the polymers of the above examples ranged from 120–125° C.

*Example 6*

A film was cast from an acetone solution of the homopolymer. The film was transparent and flexible and measured 0.002 inch in thickness. After removal of all the acetone in vacuo at 60° C. for several hours, the film became somewhat brittle.

*Example 7*

One part of poly-(isopropenyl acetate) prepared as described above was added to 22 parts of approximately 0.1 normal sodium methoxide in methanol and refluxed for two hours, using a guard tube to protect against moisture. The solution was cooled and dialyzed against water. Some polymer had precipitated and the remainder was coagulated by salt addition. The total polymer was washed with cold water and dried. The product was examined by infra-red analysis and found to be almost completely hydrolyzed to the corresponding poly-alcohol.

The above examples illustrate, but are not intended to limit this invention. The parts referred to in the examples are parts by weight. While di-t-butyl peroxide and benzoyl peroxide catalysts were used in the examples, other free radical type catalysts can be used. Higher yields will be obtained using reaction times longer than two hours. Higher pressures can be used, if desired.

As many apparent and different modifications of our invention may be made without departing from the scope and spirit thereof, it is to be understood that we do not limit ourselves in the foregoing, except as defined in the appended claims.

We claim:

1. Solid poly-(alpha-methylvinyl alcohol) produced by hydrolyzing isopropenyl acetate homopolymer, said homopolymer having an intrinsic viscosity at 25° C. in acetone solution of about 0.1 or above, a molecular weight of above about 10,000 and a melting point of above 100° C.

2. Solid poly-(alpha-methylvinyl alcohol) produced by hydrolyzing isopropenyl acetate homopolymer, said homopolymer having an intrinsic viscosity at 25° C. in acetone of above about 0.2, a molecular weight of above about 32,000 and a melting point of above about 120° C.

References Cited

UNITED STATES PATENTS

| | | | |
|---|---|---|---|
| 1,952,116 | 3/1934 | Bridgman | 260—89.1 |
| 2,643,994 | 6/1953 | Germain | 260—91.3 |
| 2,751,372 | 6/1956 | Taylor et al. | 260—89.1 |
| 2,816,883 | 12/1957 | Larchar et al. | 260—MC |

OTHER REFERENCES

Gaylord, Journal of Polymer Science, vol. 5, p. 743 (1950).

Hart et al., Journal of Polymer Science, vol. 5, pp. 55–67 (1950).

JOSEPH L. SCHOFER, *Primary Examiner.*

H. BURSTEIN, *Examiner.*

HARRY WONG, J. F. McNALLY,
*Assistant Examiners.*